United States Patent
Huang et al.

(10) Patent No.: US 7,495,407 B2
(45) Date of Patent: Feb. 24, 2009

(54) FAN ROTATIONAL SPEED CONTROLLING CIRCUIT

(75) Inventors: Ting Huang, Shenzhen (CN); Qiu Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 284 days.

(21) Appl. No.: 11/309,230

(22) Filed: Jul. 14, 2006

(65) Prior Publication Data

US 2007/0201986 A1      Aug. 30, 2007

(30) Foreign Application Priority Data

Feb. 25, 2006   (CN) .................. 2006 1 0033969

(51) Int. Cl.
G05B 11/28 (2006.01)
(52) U.S. Cl. .................. 318/599; 318/811; 318/461; 388/934
(58) Field of Classification Search ............ 318/471, 318/461, 432, 811, 599; 388/934, 800, 806, 388/815
See application file for complete search history.

(56) References Cited

U.S. PATENT DOCUMENTS

| | | | |
|---|---|---|---|
| 5,929,581 A | 7/1999 | Van Brocklin et al. | |
| 6,011,371 A | 1/2000 | Van Brocklin et al. | |
| 6,643,128 B2 * | 11/2003 | Chu et al. | 361/687 |
| 6,778,938 B1 * | 8/2004 | Ng et al. | 702/147 |
| 6,810,202 B2 * | 10/2004 | Hsu et al. | 388/800 |

* cited by examiner

*Primary Examiner*—Rina I Duda
(74) *Attorney, Agent, or Firm*—Wei Te Chung

(57) ABSTRACT

A circuit for controlling rotational speed of a fan includes a sensor, a first chipset, and a second chipset. The sensor detects an ambient temperature and generates a corresponding temperature signal. The first chipset provides a pulse-width modulation signal to the fan for driving the fan, and receives a rotational speed signal from the fan. The second chipset defines a controlling relationship between the rotational speed of the fan and the temperature. The controlling relationship is that the temperature is partitioned into a plurality of temperature ranges and each of the temperature ranges corresponds to a rotational speed range. The temperature signal is transmitted from the sensor to the second chipset via the first chipset. The second chipset determines a rotational speed range according to the controlling relationship, and controls the first chipset to adjust the pulse-width modulation signal until the actual rotational speed of the fan is in the rotational speed range.

13 Claims, 2 Drawing Sheets

FAN ROTATIONAL SPEED CONTROLLING CIRCUIT

FIELD OF THE INVENTION

The present invention relates to fan rotational speed controlling circuits, more particularly to a circuit which modulates the fan rotational speed according to fluctuation of temperature in a computer system.

DESCRIPTION OF RELATED ART

With the development of the computer industry, operating frequencies of most components in computer systems have become higher, and the heat generated by these components has become greater as well. If the heat is not dispelled in a timely fashion, the computer system may be seriously damaged. So, a fan is usually used for preventing the temperature in the computer system from becoming too high. Generally, the greater the fan rotational speed is, the better the effect of dispelling the heat is. However, greater, fixed fan rotational speeds add noise, and use a lot of energy that is wasteful and unnecessary during those times when the heat generated within a computer enclosure is not so great. So, it is necessary to control the fan rotational speed according to a temperature in the computer system.

Using pulse-width modulation (PWM) to control the rotational speed of a cooling fan is an established method for reducing the cost of a variable speed fan in a cooling system. Pulse-width modulating signals can vary the operating speeds of the cooling fan. For example, a pulse-width modulating signal having a duty cycle of 100 percent makes the fan run at its nominally highest rate. Whereas, a pulse-width modulating signal having a duty cycle of 50 percent makes the fan run at a rate approximately half of its highest rate. The rotational speed of the fan varies according to the duty cycle. However, limited by manufacture technology, fans made due to the same specification actually have different rotational speeds under the same duty cycle, even if the fans are produced by the same manufacturer. It is hard to precisely control different fans in different computer systems via a same control mode.

It is therefore desirable to find a new fan rotational speed controlling circuit which can overcome the above mentioned problems.

SUMMARY OF THE INVENTION

A circuit for controlling rotational speed of a fan includes a sensor, a first chipset, and a second chipset. The sensor detects an ambient temperature and generates a corresponding temperature signal. The first chipset provides a pulse-width modulation signal to the fan for driving the fan, and receives a rotational speed signal from the fan. The second chipset defines a controlling relationship between the rotational speed of the fan and the temperature. The controlling relationship is that the temperature is partitioned into a plurality of temperature ranges and each of the temperature ranges corresponds to a rotational speed range. The temperature signal is transmitted from the sensor to the second chipset via the first chipset. The second chipset determines a rotational speed range according to the controlling relationship, and controls the first chipset to adjust the pulse-width modulation signal until the actual rotational speed of the fan is in the rotational speed range.

Other advantages and novel features will be drawn from the following detailed description of preferred embodiments with attached drawings, in which:

DETAILED DESCRIPTION OF THE INVENTION

Figure 1:
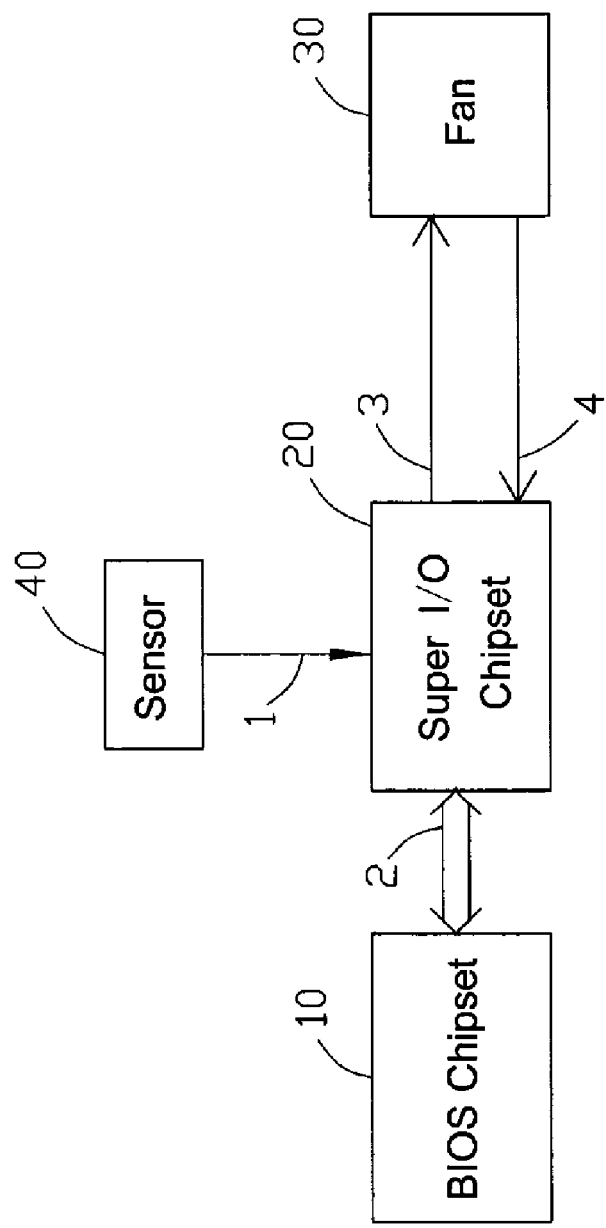
FIG. 1 is a circuit diagram of a fan rotational speed controlling circuit in accordance with a preferred embodiment of the present invention.

Referring to FIG. 1, a fan rotational speed controlling circuit for controlling a rotational speed of a fan 30 in accordance with a preferred embodiment of the present invention, includes a basic input/output system (BIOS) chipset 10 and a super input/output (I/O) chipset 20.

The super I/O chipset 20 includes a first interface 1, a second interface 2, a third interface 3, and a fourth interface 4. The first interface 1 is connected to a sensor 40, which is disposed on a heat generating component like an integrated circuit (such as a CPU) or other point to detect the ambient temperature and generate a temperature signal.

The second interface 2 is connected to the BIOS chipset 10 for communication between the super I/O chipset 20 and the BIOS chipset 10. The third interface 3 is connected to the fan 30 for transmitting a pulse-width modulation (PWM) signal to drive the fan 30. The fourth interface 4 is connected to the fan 30 for receiving a fan rotational speed signal of the fan 30.

Figure 2:
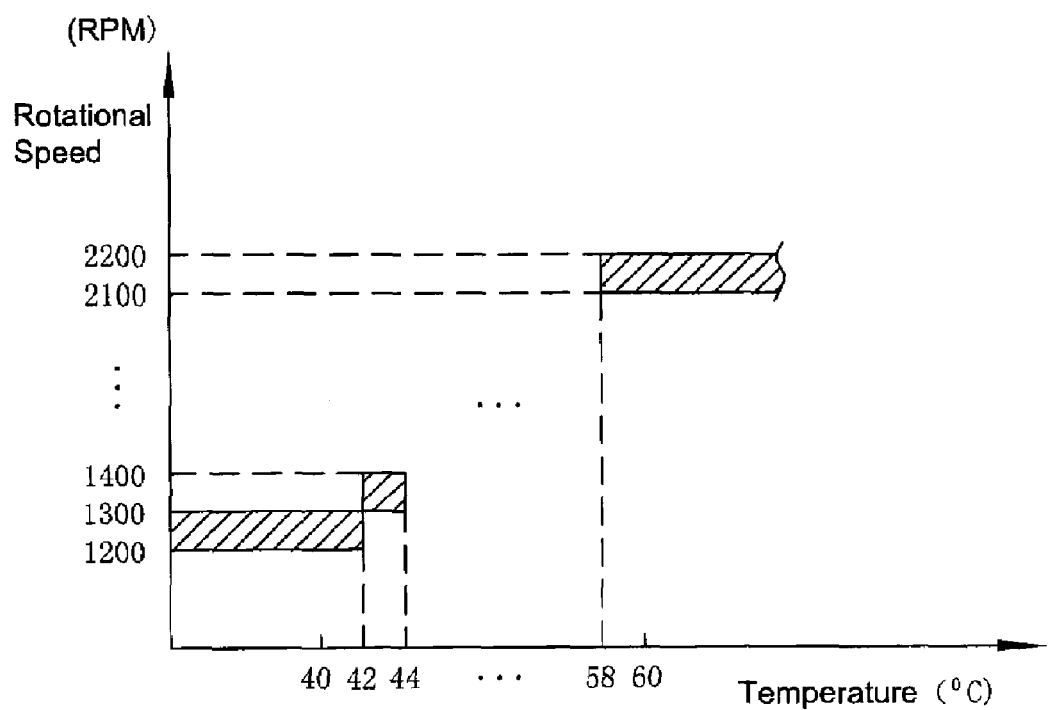
FIG. 2 is a diagram showing a temperature-speed relationship of the circuit of FIG. 1.

The BIOS chipset 10 defines a controlling relationship between the temperature and a rotational speed of the fan 30, as depicted in FIG. 2. The temperature is partitioned into a plurality of temperature ranges. When the temperature is below 42 degrees Celsius, the rotational speed is modulated in the range of 1200 to 1300 rpm. When the temperature is equal to or greater than 42 but less than 44 degrees Celsius, the rotational speed is modulated in the speed range of 1300 to 1400 rpm. The higher the temperature is, the faster the fan 30 rotates. The rotational speed interval in each temperature range, such as 42 to 44 degrees Celsius, should be smaller enough to precisely control the rotational speed of the fan 30.

Described below is a working principle of the circuit.

When the computer system is running, the fan 30 is driven by a PWM signal sent from the super I/O chipset 20 to drive the fan 30 rotating at a speed. The fan 30 feeds back a rotational speed signal, which indicates the actual rotational speed of the fan 30, to the super I/O chipset 20. The super I/O chipset 20 transmits the rotational speed signal to the BIOS chipset 10.

The sensor 40 detects an ambient temperature of the computer system, and sends a corresponding temperature signal to the super I/O chipset 20. The super I/O chipset 20 transmits the temperature signal to the BIOS chipset 10. The BIOS chipset 10 determines a desired rotational speed range of the fan 30 according to the controlling relationship.

The BIOS chipset 10 checks if the actual rotational speed is in the corresponding rotational speed range.

If the actual rotational speed is in the desired rotational speed range, the duty cycle of the PWM signal provided to the fan 30 remains unchanged.

If the actual rotational speed is greater than the maximum rotational speed of the desired rotational speed range, the duty cycle of the PWM signal provided to the fan 30 is reduced to slow the rotational speed of the fan 30 until the actual rotational speed is in the desired rotational speed range.

If the actual rotational speed is less than the minimum rotational speed of the desired rotational speed range, the duty cycle of the PWM signal provided to the fan 20 is adjusted to increase the rotational speed of the fan 30 until the actual rotational speed is in the desired rotational speed range.

In the above preferred embodiment, the super I/O chipset 20 and the BIOS chipset 10 can be replaced by other chipsets that have the same functions, or be replaced by an integrated controller unit.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit for controlling rotational speed of a fan, comprising:

a sensor detecting an ambient temperature and generating a corresponding temperature signal;

a first chipset connected to the fan and the sensor, the first chipset providing a pulse-width modulation signal to the fan for driving the fan, and receiving a rotational speed signal which indicates an actual rotational speed of the fan from the fan; and a second chipset connected to the first chipset, the second chipset defining a controlling relationship between the rotational speed of the fan and the temperature, wherein the temperature is partitioned into a plurality of temperature ranges and each of the temperature ranges corresponds to a rotational speed range of the fan;

wherein the temperature signal is transmitted from the sensor to the second chipset, so that the second chipset determines a desired rotational speed range according to the controlling relationship, and controls the first chipset to adjust the pulse-width modulation signal until the actual rotational speed of the fan is in the desired rotational speed range.

2. The circuit as described in claim 1, wherein the first chipset is a super I/O chipset.

3. The circuit as described in claim 2, wherein the second chipset is a BIOS chipset.

4. The circuit as described in claim 1, wherein when the actual rotational speed is in the rotational speed range, the pulse-width modulation signal is kept the same.

5. The circuit as described in claim 4, wherein when the actual rotational speed is not in the rotational speed range, the pulse-width modulation signal is changed to adjust the rotational speed to be in the rotational speed range.

6. The circuit as described in claim 1, wherein a duty cycle of the pulse-width modulation signal is changed to adjust the pulse-width modulation signal.

7. The circuit as described in claim 6, wherein the duty cycle of the pulse-width modulation signal provided to the fan is lowered to slow the rotational speed of the fan, and the duty cycle of the pulse-width modulation signal provided to the fan is increased to increase the rotational speed of the fan.

8. A method for controlling rotational speed of a fan, comprising the steps of:

a first chipset defining a controlling relationship between a rotational speed of a fan and a temperature, wherein the temperature is partitioned into a plurality of temperature ranges and each of the temperature ranges corresponds to a rotational speed range of the fan;

a sensor detecting an ambient temperature and generating a corresponding temperature signal;

the temperature signal transmitted to the first chipset, and the first chipset determining a desired rotational speed range according to the controlling relationship;

the fan outputting a rotational speed signal which indicates an actual rotational speed of the fan to the first chipset via a second chipset; and the first chipset comparing the actual rotating speed with the desired rotational speed range, and controlling the second chipset to adjust a pulse-width modulation signal which drives the fan until the actual rotational speed of the fan is in the desired rotational speed range.

9. The method as described in claim 8, wherein a duty cycle of the pulse-width is changed to modulate the actual rotational speed of the fan.

10. The method as described in claim 9, wherein adjusting the pulse-width modulation to modulate the actual rotational speed of the fan to be in the desired rotational speed range comprises the detailed steps of:

if the actual rotational speed is in the desired rotational speed range, a duty cycle of the pulse-width modulation signal provided to the fan remains unchanged;

if the actual rotational speed is greater than the maximum rotational speed of the desired rotational speed range, the duty cycle of the pulse-width modulation signal provided to the fan is reduced to slow the rotational speed of the fan; and if the actual rotational speed is less than the minimum rotational speed of the desired rotational speed range, the duty cycle of the pulse-width modulation signal provided to the fan is increased to increase the rotational speed of the fan.

11. The method as described in claim 8, wherein the first chipset is a BIOS chipset, the second chipset is a super I/O chipset.

12. A method for controlling a fan, comprising the steps of:

defining a plurality of temperature ranges for a heat generating component and corresponding rotational-speed ranges thereto for a fan used to cool said component;

sensing temperature of said component to locate said temperature within one of said plurality of temperature ranges and a corresponding one of said rotational-speed ranges;

retrieving an actual rotational speed from said fan; and adjusting said actual rotational speed of said fan to maintain a value of said retrieved actual rotational speed within said corresponding one of said rotational-speed ranges.

13. The method as described in claim 12, wherein at least one process is performed in said adjusting step, said at least one process is selected from a first process of allowing said actual rotational speed of said fan to remain unchanged when said value of said actual rotational speed is within said corresponding one of said rotational-speed ranges, a second process of decreasing said actual rotational speed when said value of said actual rotational speed is higher than a maximum of said corresponding one of said rotational-speed ranges, and a third process of increasing said actual rotational speed when said value of said actual rotational speed is lower than a minimum of said corresponding one of said rotational-speed ranges.

* * * * *